United States Patent
Guha-Thakurta

(10) Patent No.: US 7,753,406 B2
(45) Date of Patent: Jul. 13, 2010

(54) AIR BAG AND A METHOD OF FOLDING AN AIR BAG

(75) Inventor: Sarbasubha Guha-Thakurta, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 381 days.

(21) Appl. No.: 10/905,235

(22) Filed: Dec. 22, 2004

(65) Prior Publication Data

US 2006/0131858 A1    Jun. 22, 2006

(51) Int. Cl.
*B60R 21/16* (2006.01)

(52) U.S. Cl. .................................................. 280/743.1

(58) Field of Classification Search .............. 280/743.1, 280/732, 731
See application file for complete search history.

(56) References Cited

U.S. PATENT DOCUMENTS

| | | | | |
|---|---|---|---|---|
| 5,022,675 A * | 6/1991 | Zelenak et al. | ............ | 280/743.1 |
| 5,140,799 A * | 8/1992 | Satoh | ............ | 53/429 |
| 5,178,407 A | 1/1993 | Kelley | | |
| 5,249,825 A | 10/1993 | Gordon et al. | | |
| 5,290,061 A | 3/1994 | Bollaert | | |
| 5,320,380 A * | 6/1994 | Hamada et al. | ............ | 280/728.3 |
| 5,348,341 A * | 9/1994 | Webber | ............ | 280/728.1 |
| 5,382,048 A | 1/1995 | Paxton et al. | | |
| 5,419,579 A * | 5/1995 | McPherson et al. | ............ | 280/743.1 |
| 5,478,113 A * | 12/1995 | Rogers | ............ | 280/743.1 |
| 5,489,119 A | 2/1996 | Prescaro et al. | | |
| 5,492,367 A * | 2/1996 | Albright et al. | ............ | 280/743.1 |
| 5,496,056 A | 3/1996 | Dyer | | |
| 5,533,755 A * | 7/1996 | Nelsen et al. | ............ | 280/743.1 |
| 5,538,281 A * | 7/1996 | Patercsak | ............ | 280/743.1 |
| 5,570,900 A * | 11/1996 | Brown | ............ | 280/729 |
| 5,676,395 A | 10/1997 | Oe et al. | | |
| 5,730,463 A * | 3/1998 | Fisher et al. | ............ | 280/743.1 |
| 5,855,393 A * | 1/1999 | Keshavaraj | ............ | 280/743.1 |
| 5,984,852 A * | 11/1999 | Heudorfer et al. | ............ | 493/457 |
| 6,024,380 A * | 2/2000 | Kim et al. | ............ | 280/743.1 |
| 6,196,585 B1 * | 3/2001 | Igawa | ............ | 280/743.1 |
| 6,739,622 B2 * | 5/2004 | Halford et al. | ............ | 280/743.1 |
| 6,827,171 B2 * | 12/2004 | Igawa | ............ | 180/274 |
| 6,832,779 B2 * | 12/2004 | Tajima et al. | ............ | 280/743.1 |
| 7,156,418 B2 * | 1/2007 | Sato et al. | ............ | 280/730.2 |
| 2002/0093184 A1 * | 7/2002 | Hirano et al. | ............ | 280/743.1 |
| 2003/0102177 A1 * | 6/2003 | Igawa | ............ | 180/271 |
| 2004/0251668 A1 * | 12/2004 | Schneider et al. | ............ | 280/743.1 |
| 2006/0131858 A1 * | 6/2006 | Guha-Thakurta | ............ | 280/743.1 |

\* cited by examiner

*Primary Examiner*—Paul N. Dickson
*Assistant Examiner*—Karen Jane J Amores
(74) *Attorney, Agent, or Firm*—Frank A. MacKenzie; Brooks Kushman P.C.

(57) ABSTRACT

An air bag for a motor vehicle and a method of folding an air bag. The method includes the steps of positioning the air bag, extending the air bag in a first direction, positioning first and second perimeter sections of the air bag toward a center line to create upper and lower pleats, and rolling the air bag in a second direction disposed opposite the first direction.

20 Claims, 5 Drawing Sheets

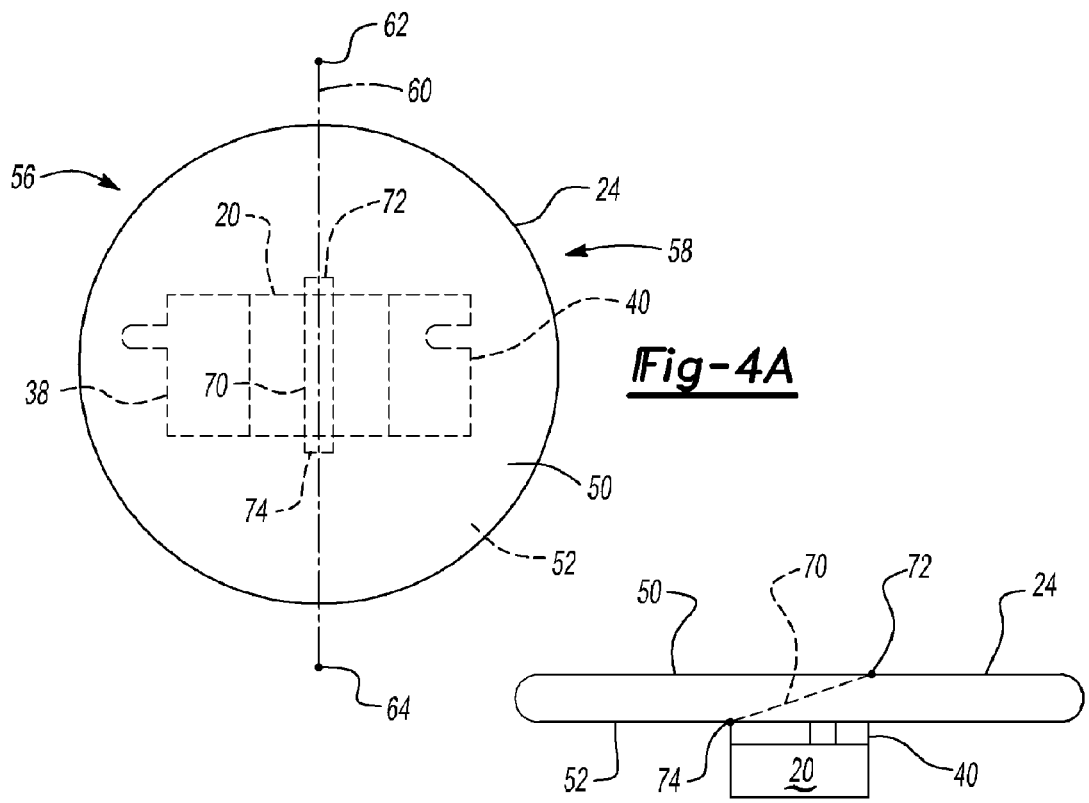
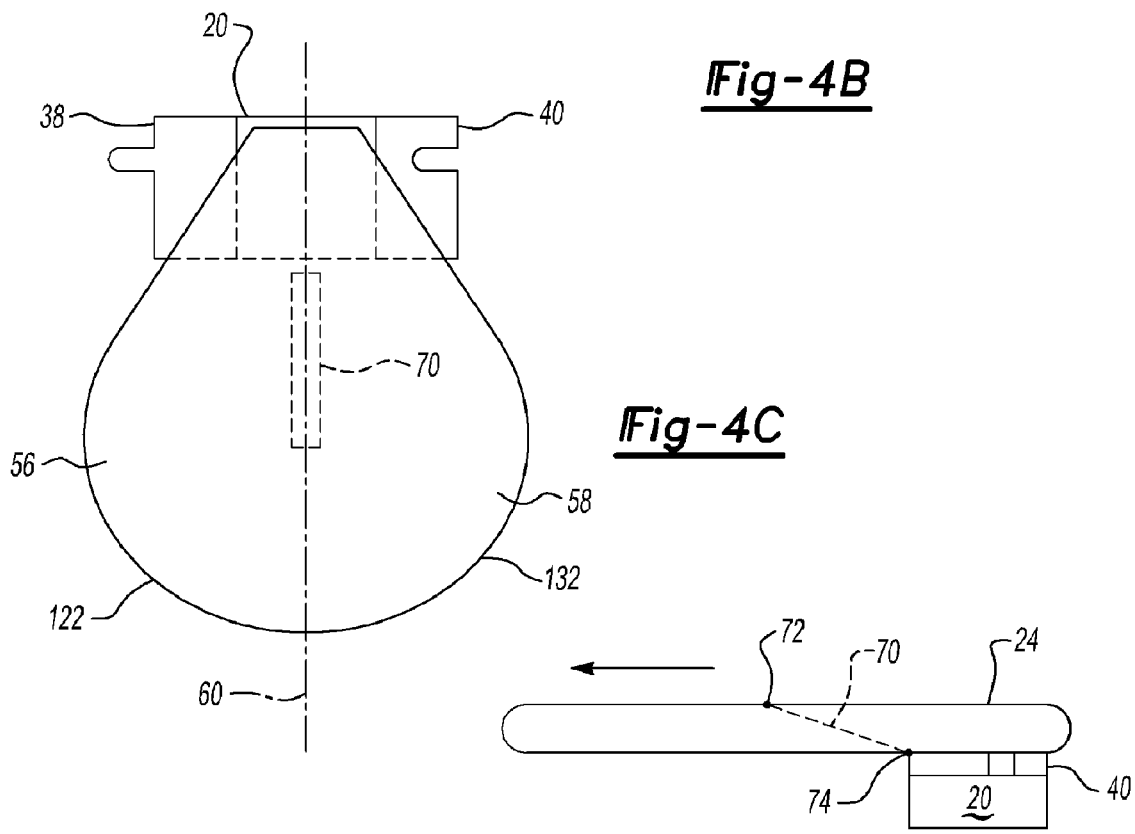

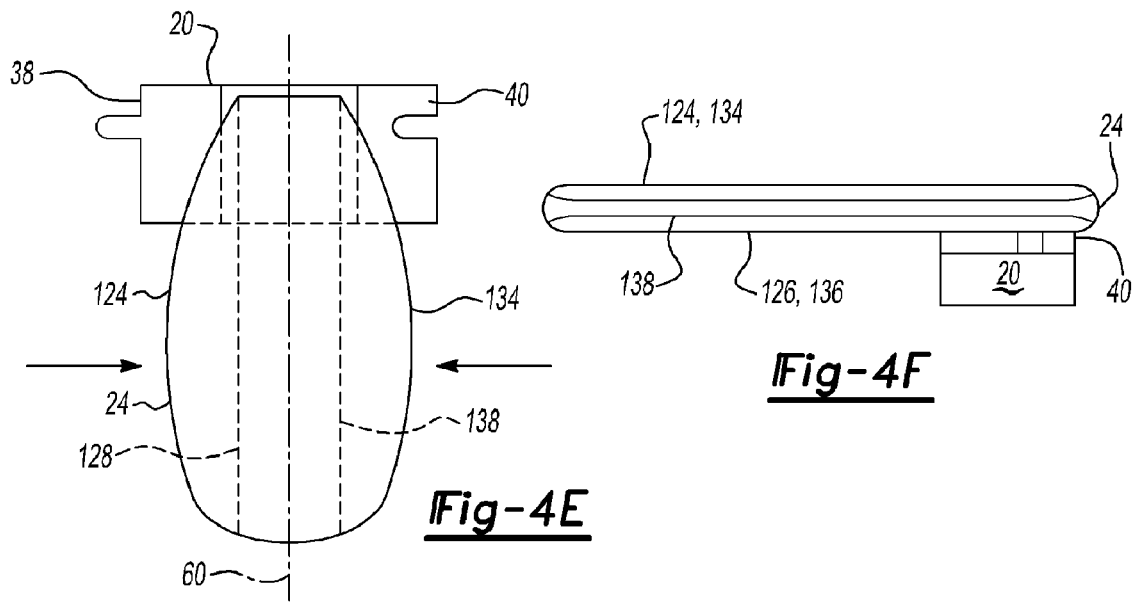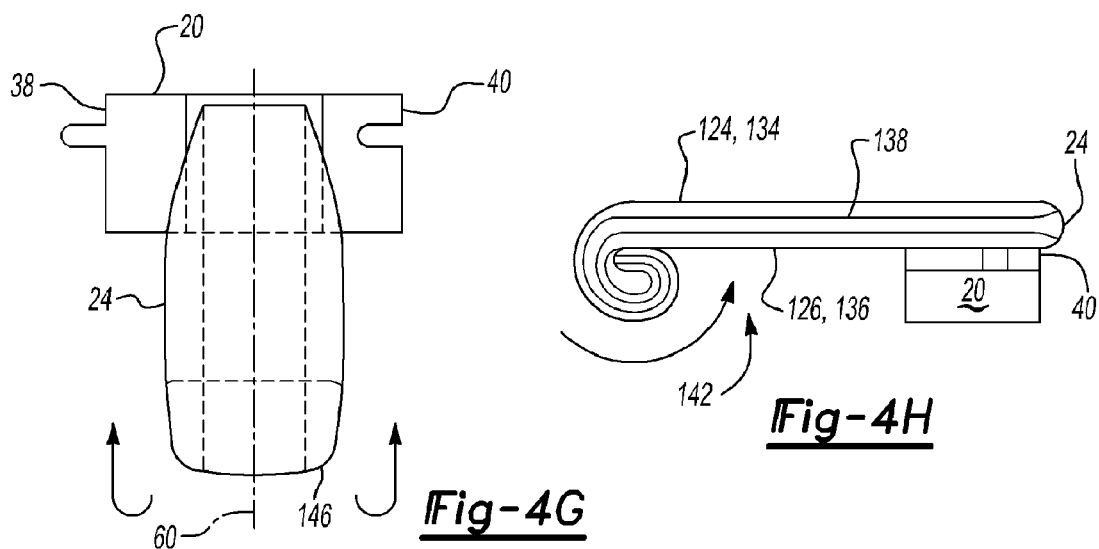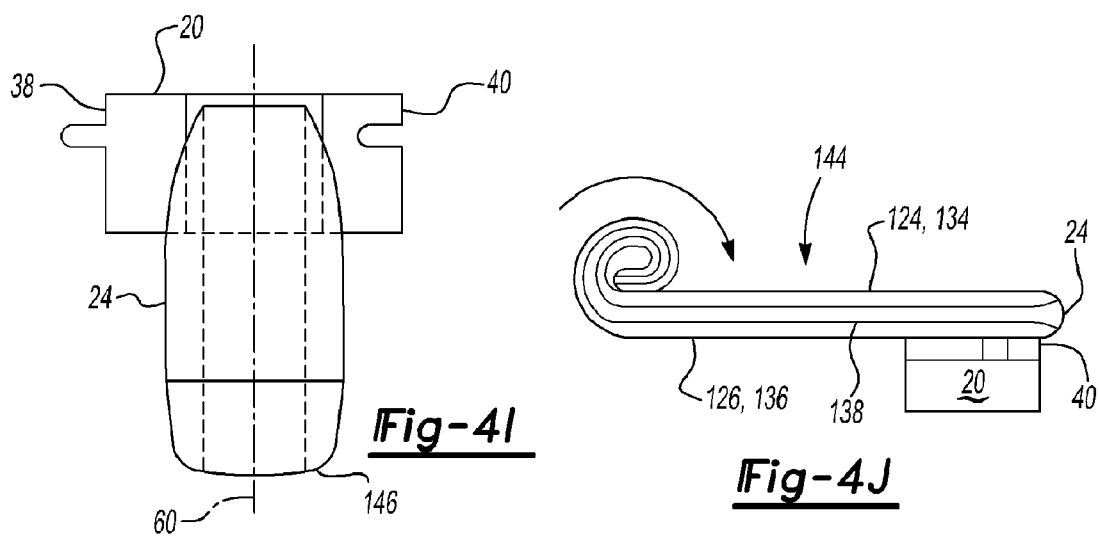

AIR BAG AND A METHOD OF FOLDING AN AIR BAG

BACKGROUND OF THE INVENTION

1. Field of the Invention

The present invention relates to an air bag and a method of folding an air bag, and more particularly to a method of folding an air bag to influence the direction of air bag deployment.

2. Background Art

Motor vehicles may include one or more air bags that are inflated to cushion an occupant during a vehicle impact event. Previously, various designs were employed to bias the direction in which an air bag inflates during deployment. In one design, a motor vehicle air bag was equipped with an internal diffuser panel that directed inflation gas in a predetermined direction to inflate one side of an air bag before other portions of the air bag. Such diffuser panels inadequately influenced the direction of air bag deployment and increased air bag costs.

In another design, an air bag module was aimed to direct air bag deployment. More specifically, the air bag module incorporated a housing in which an uninflated air bag was stored. The air bag deployed perpendicular to a housing opening. Consequently, the direction of air bag deployment was controlled only by the orientation of the air bag module. Such "aimed" air bag modules increase space requirements and may be infeasible due to vehicle packaging constraints. Even if there is sufficient packaging space, these air bag modules noticeably protrude from vehicle surfaces, thereby degrading passenger compartment aesthetics. Moreover, such air bag modules may be aimed in a manner that reduces air bag effectiveness. For example, an air bag mounted proximate a steering wheel may be aimed so as not to cover the entire steering wheel. Consequently, the air bag may not prevent an occupant from contacting the steering wheel during an impact event.

Before Applicant's invention, an improved method of folding an air bag was needed to better control the direction of air bag deployment and improve occupant protection. In addition, an air bag and a method that did not employ diffusers was needed to improve air bag deployment effectiveness and reduce associated costs. In addition, an air bag and method that did not depend solely on air bag module orientation to control the direction of air bag deployment was needed to accommodate space limitations, improve vehicle aesthetics, and improve occupant safety. Problems associated with the prior art as noted above and other problems are addressed by Applicant's invention as summarized below.

SUMMARY OF THE INVENTION

According to one aspect of the present invention, a method of folding an air bag is provided. The air bag, which is initially uninflated, includes a front panel and a back panel disposed opposite the front panel.

The method includes the steps of positioning the air bag such that a center line divides the front and back panels into symmetrical first and second side portions, extending the air bag in a first direction along the center line, positioning a first perimeter section of the first side portion toward the center line to create a first upper pleat and a first lower pleat, positioning a second perimeter section of the second side portion toward the center line to create a second upper pleat and a second lower pleat, and rolling the air bag in a second direction disposed opposite the first direction. The method controls the direction of air bag deployment to improve occupant protection without diffuser panels or increased packaging space.

The air bag may be disposed proximate a housing having a cavity and a trim panel. The method may include the step of positioning the trim panel to conceal the air bag.

The step of positioning the air bag may include centering the front panel over the back panel. The step of extending the air bag may include extending the air bag in the first direction until the back panel is pulled taught against the housing.

The step of rolling the air bag may include rolling the air bag along a lower side having the first and second lower pleats or along an upper side having the first and second upper pleats. The step of rolling the air bag may include packing the air bag into the cavity.

According to another aspect of the present invention, a method of folding an inflatable air bag for a motor vehicle is provided. The air bag is associated with an air bag module having a housing that includes a cavity and an inflator adapted to provide an inflator gas to inflate the air bag from a deflated condition to an inflated condition. The air bag includes a front panel and a back panel disposed opposite the front panel.

The method includes the steps of positioning the air bag such that at least a portion of the back panel is disposed proximate the housing and at least a portion of the front panel is disposed proximate the back panel, centering the air bag about the housing such that a center line divides the front and back panels into first and second side portions, extending the air bag in a first direction along the center line, positioning a first perimeter section of the first side portion toward the center line to create a first upper pleat and a first lower pleat, positioning a second perimeter section of the second side portion toward the center line to create a second upper pleat and a second lower pleat, rolling the air bag in a second direction disposed opposite the first direction, and packing the air bag into the cavity.

The step of rolling the air bag may include rolling the air bag toward the housing until a rolled portion of the air bag is disposed in the cavity.

The housing may include a front surface disposed adjacent to the cavity. The step of positioning the air bag may include positioning the front and back panels approximately parallel to the front surface.

The housing may include first and second doors. The step of packing the air bag may include positioning the first and second doors to conceal the air bag.

According to another aspect of the present invention, an air bag for a motor vehicle is provided. The air bag is associated with an inflator adapted to provide an inflation gas to actuate the air bag from a deflated condition to an inflated condition and a housing adapted to receive the air bag when in a deflated condition. The air bag includes a front portion, a back portion disposed opposite the front portion, first and second side portions, first and second folded portions, and a rolled portion.

The first and second side portions are disposed on opposite sides of a center line that symmetrically divides the front and back portions when the air bag is deflated and extended along the center line in a first direction. The first folded portion is formed along the first side portion and includes a first upper pleat, a first lower pleat, and a first fold disposed between the first upper and lower pleats. The second folded portion is formed along the second side portion and includes a second upper pleat, a second lower pleat, and a second fold disposed between the second upper and lower pleats. The rolled portion incorporates the first and second folded portions. The rolled portion may unroll away from a head of a vehicle occupant when the air bag is inflated to improve occupant safety and reduce forces exerted on the head and/or neck of the occupant.

The air bag may include a tether disposed between the front and back panels. The tether may extend parallel to the center line and may be disposed between first and second folds.

DETAILED DESCRIPTION OF THE PREFERRED EMBODIMENT(S)

Figure 1:
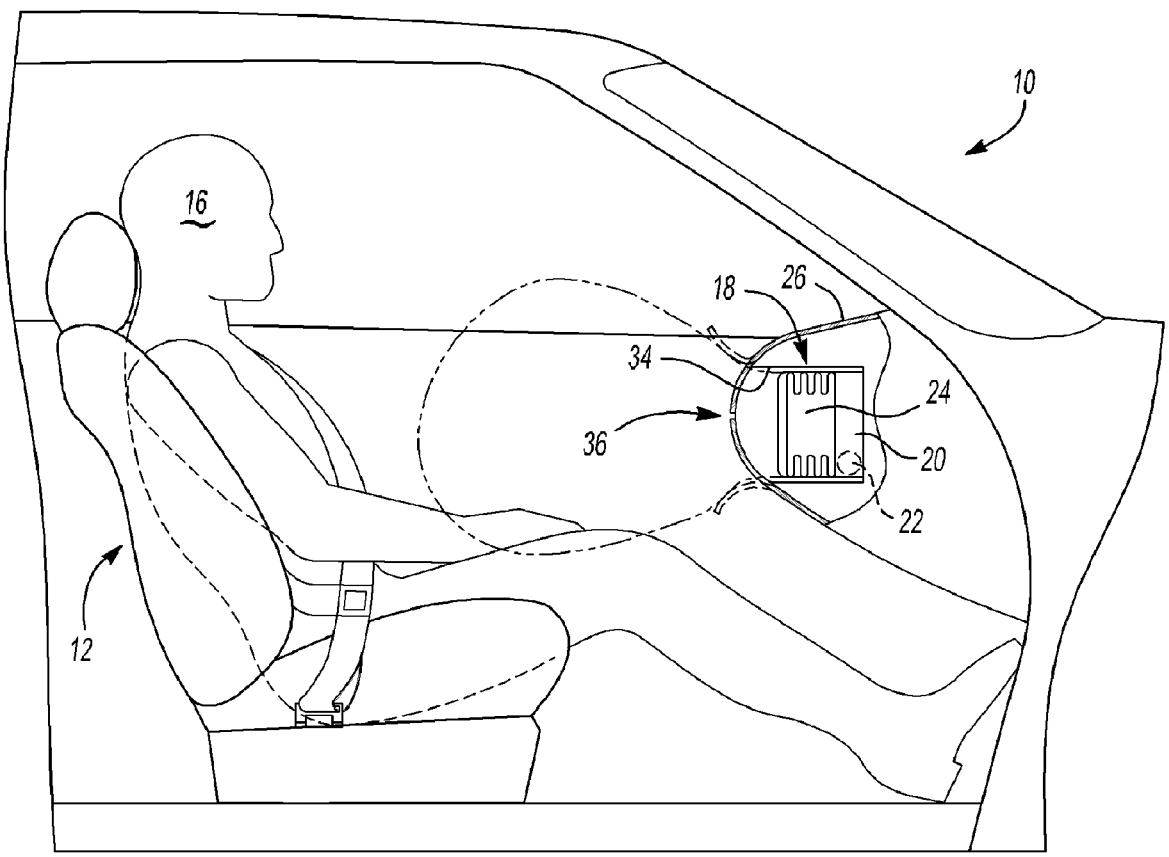
FIG. 1 is a fragmentary side view of a vehicle having an air bag module.

Certain terminology presented below is used for convenience in reference only and is not intended to be limiting. More specifically, directional language such as "front", "back", "top", "bottom", "upper", "lower" and words of similar import designate directions shown in the drawings. Such directional terminology is used for clarity and is not intended to limit the orientation of any aspect of the invention to a particular plane or direction unless otherwise stated.

Referring to FIG. 1, a side view of a vehicle 10 is shown. The vehicle 10 includes a seat assembly 12 and an air bag module 14. The seat assembly 12 is adapted to receive an occupant 16. The air bag module 14 is adapted to deploy an air bag to cushion the occupant 16 during a vehicle impact event.

Figure 2:
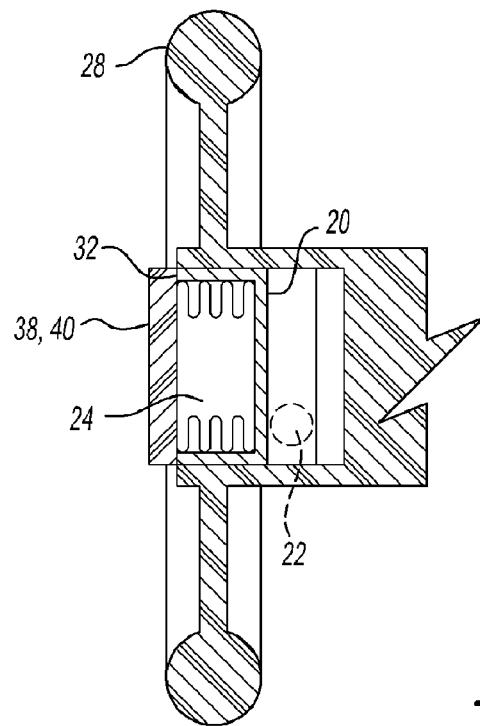
FIG. 2 is a perspective view of an air bag module disposed proximate a steering wheel.

Referring to FIGS. 1 and 2, the air bag module 14 is shown in more detail. The air bag module 14 includes a housing 20, an inflator 22, and an air bag 24. The air bag module 14 may be disposed in any suitable location. In FIG. 1, the air bag module 14 is disposed on a passenger side of the vehicle 10 proximate an instrument panel 26. In FIG. 2, the air bag module 14 is disposed on a driver side of the vehicle 10 proximate a steering wheel assembly 28.

The housing 20 includes a plurality of panels that define a cavity 30. The cavity 30 is adapted to receive the air bag 24 when the air bag 24 is in a stored condition in which the air bag 24 is deflated and folded as will be described in more detail below. In addition, the housing 20 includes a front surface 32 disposed adjacent to the perimeter of the cavity 30.

The housing 20 may be disposed in any suitable location. In the embodiment shown in FIG. 1, the housing 20 is coupled to an interior surface of the instrument panel 26 via a chute 34 and disposed near deployment doors 36 incorporated in the instrument panel 26. In the embodiment shown in FIG. 2, the housing 20 is disposed proximate the steering wheel assembly 28 and includes first and second deployment doors 38,40. The deployment doors 36,38,40 are adapted to conceal the air bag 24 prior to deployment and open in response to force exerted by the air bag 24 when the air bag 24 is inflated.

The inflator 22 is adapted to provide an inflation gas to the air bag 24. The inflator 22 may be disposed in any suitable location. In FIGS. 1 and 2, the inflator 22 is disposed proximate the housing 20. Alternatively, the inflator 22 may be spaced apart from the housing 20 and connected to the air bag 24 via a tube.

The air bag 24 is configured to expand from a stored condition to a deployed condition when the inflation gas is provided. More specifically, the air bag 24 is deflated and concealed by an interior vehicle surface, such as the deployment doors 34,36,38 when in the stored condition and is inflated and positioned between the occupant 16 and the interior vehicle surface when in the inflated condition. In the embodiment shown in FIG. 1, the stored condition is shown in solid lines and the deployed condition is shown in phantom.

The air bag 24 may have any suitable configuration and may be made of any suitable material. In FIGS. 1 and 2, the air bag 24 includes a front panel 50 and a back panel 52. The front and back panels 50,52 may be integrally formed or may be separate components that are assembled in any suitable manner, such as by stitching, bonding, or with an adhesive.

The back panel 52 is disposed opposite the front panel 50 and adjacent to the housing 20. The back panel 52 may include an inlet for receiving inflation gas from the inflator 22. In addition, the back panel 52 may include an inflator attachment feature, such as a plurality of flaps that define a pocket for receiving the inflator 22.

The air bag 24 may be divided into first and second side portions 56,58 by a center plane or center line 60. The center line 60 divides the air bag 24 into generally symmetric or similarly shaped portions. Moreover, the center line 60 may be configured to divide the housing 20 into generally symmetric halves as shown in FIG. 4A. The centerline 60 includes a first end 62 and a second end 64 disposed opposite the first end 62.

Optionally, the air bag 24 may include one or more tethers 70 that control the shape of the air bag 24 upon deployment. The tether 70 may be disposed between the front and back panels 50,52. In addition, the tether 70 may be disposed generally parallel to the center line 60 to facilitate positioning of the air bag 24 along the center line 60 as will be discussed in detail below. More specifically, the tether 70 may be attached to the front panel 50 at a first tether end 72 and attached to the back panel 52 at a second tether end 74. In the embodiment shown, the first tether end 72 is located closer to the first end 62 of the center line 60 than the second tether end 74 to permit the air bag 24 to be positioned or extended toward the second end 64.

Figure 3:
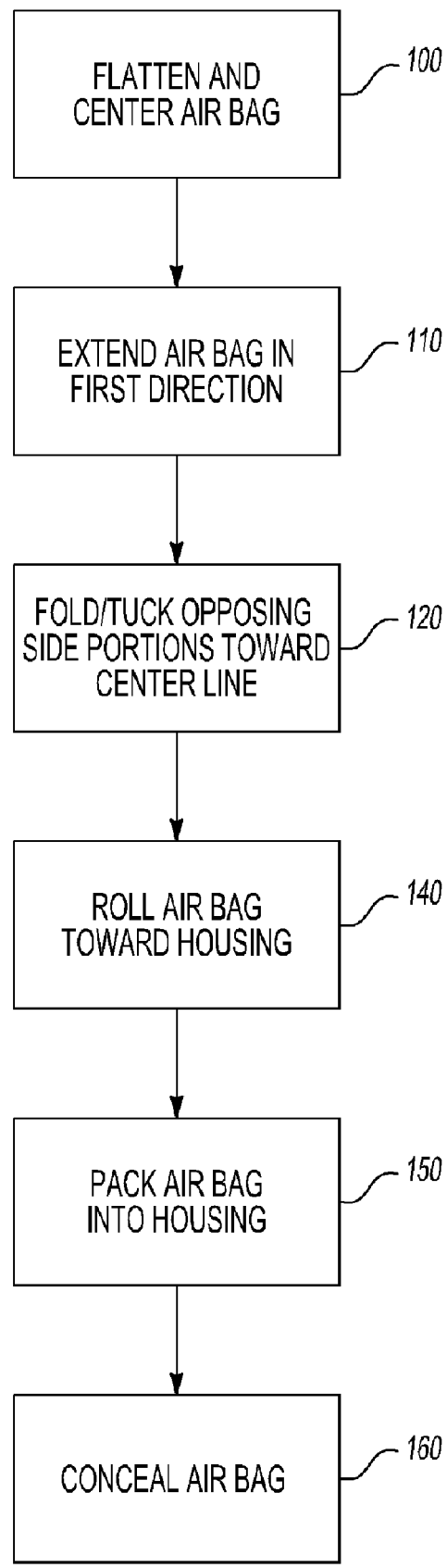
FIG. 3 is a flowchart of a method of folding an air bag.

Referring to FIG. 3, a flowchart of a method of folding an air bag is shown. The steps of the method are graphically depicted in FIGS. 4A-4O.

At 100, the method begins by preparing the air bag for subsequent folding steps. More specifically, the air bag 24 is deflated, laid flat, and centered as shown in FIGS. 4A and 4B. The air bag 24 may be centered by aligning the front and back panels 50,52 and/or by centering the perimeter of the air bag 24 relative to the center of housing 20. The air bag 24 is flattened when it is deflated and the front and back panels 50,52 are disposed proximate each other.

At 110, the air bag is extended or pulled in the first direction as shown in FIGS. 4C-4D. More specifically, the air bag 24 is pulled in the first direction until it is pulled taught against the housing 20 and/or inflator 22. The first direction extends along the center line 60 from the first end 62 toward the second end 64 and is represented by the arrowed line. The air bag 24 generally remains flattened when extended, but is no longer centered about the housing 20. Moreover, in an air bag having a tether, the first tether end 72 translates along the center line 60 and the second tether end 74 remains generally stationary as the air bag 24 is extended as shown in FIGS. 4B and 4D. As such, the tether 70 pivots about the second tether end 74 when the air bag 24 is extended in the first direction.

At 120, the first and second side portions 56,58 are positioned toward the center line as shown in FIGS. 4E-4F. More specifically, a first perimeter section 122 of the first side portion 56 is folded or tucked toward the center line 60 to create a first upper pleat 124, a first lower pleat 126, and a first fold 128. Similarly, a second perimeter section 132 of the second side portion 58 is folded or tucked toward the center line 60 to create a second upper pleat 134, a second lower pleat 136, and a second fold 138. The first and second folds 128,138 may be positioned between the first upper and lower pleats 124,126 and second upper and lower pleats 134,136, respectively. In addition, the first and second folds 128,138 may be positioned such that the width of the partially folded air bag 24 along an axis perpendicular to the center line 60 is similar to the width of the cavity 30. As such, the first and second folds 128,138 may be disposed next to or spaced apart from each other.

At 140, the air bag is rolled toward the housing 20 as shown in FIGS. 4G-4J. More specifically, the air bag 24 is rolled along the center line 60 in a second direction disposed opposite the first direction as shown by the arrows. The air bag 24 may be rotated in any suitable direction when being rolled. In the embodiment shown in FIGS. 4G-4H, the air bag is rolled along a lower side 142 having the first and second lower pleats 126,136. In the embodiment shown in FIGS. 4I-4J, the air bag is rolled along an upper side 144 having the first and second upper pleats 124,134. As such, the rolled portion 146 of the air bag 24 incorporates the folded and pleated portions. Moreover, the air bag 24 may be repeatedly rolled toward the housing 20 until the air bag 24 is generally disposed in the cavity 30 or until there is insufficient material to permit rolling to continue.

Figure 4K:
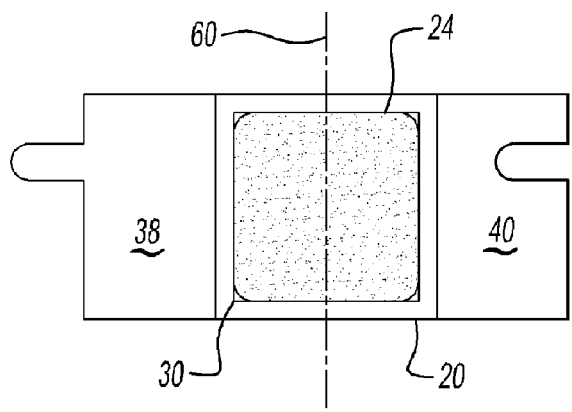
FIGS. 4A-4O graphically depict the steps of the method of FIG. 3.

At 150, the rolled air bag is positioned or packed into the housing 20 as shown in FIGS. 4K-4M. The air bag 24 may be compressed to better accommodate the shape of the housing cavity and permit a trim panel to be positioned to conceal the air bag 24.

Figure 4N:
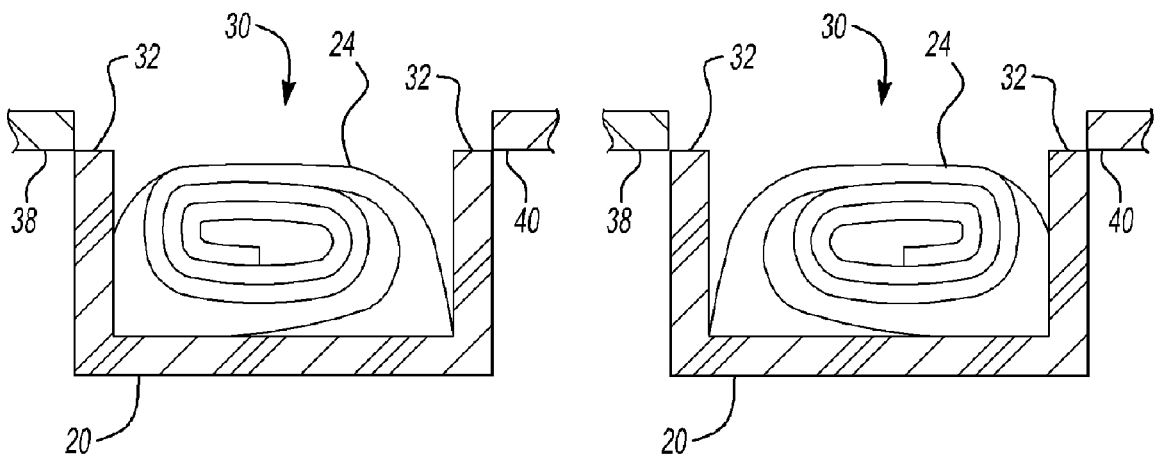
Figure 4N:
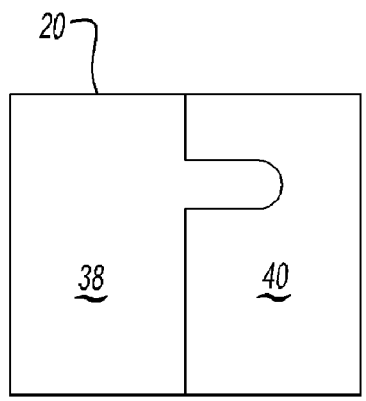
Figure 4O:
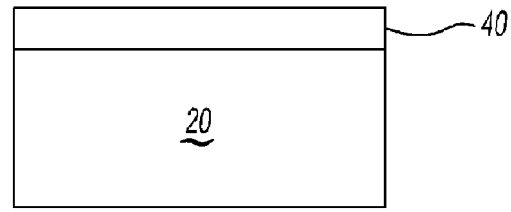

At 160, the air bag 24 is concealed in any suitable manner. In the embodiment shown in FIGS. 4N-4O, the first and second deployment doors 38,40 are closed to conceal 30 the cavity and the air bag 24. In a mounting configuration such that shown in FIG. 1, concealment may be accomplished by the deployment doors 36 on the instrument panel 26 or simply by mounting the air bag module 14 proximate an instrument panel surface.

The air bag and method of the present invention permit the direction of air bag deployment to be controlled without the use of an internal diffuser panel or solely relying on the orientation of the air bag module. More specifically, when an air bag folded in the manner previously described is inflated, it unrolls along the center line or center plane. The steps of the method cause the air bag to be directed or biased toward the side upon which the air bag was rolled. For example, the air bag in FIGS. 4G-4H deploys downward or toward the lower side 142. The air bag in FIGS. 4I-4J deploys toward the upper side 144. As such, in a vertically mounted air bag module (i.e., when the cavity opening is in a vertical plane) the air bag will deploy at an angle of approximately 5 to 45 degrees from a horizontal plane.

The air bag and method of the present invention improve occupant safety. Evaluation tests performed in accordance with National Highway Transportation Safety Administration (NHTSA) standards have shown that the forces on the head and neck of a vehicle occupant may be reduced when an air bag is folded in accordance with the present invention. More specifically, "NHTSA 1" and "NHTSA 2" evaluations were performed with a driver side air bag module. The evaluations were performed with a conventional "accordion" folded air bag (i.e., the air bag was not extended in a first direction or rolled) and an air bag folded in accordance with the present invention with the roll direction shown in FIGS. 4G-4H. The NHTSA 1 evaluations showed that average upper neck tension and moment forces were reduced by 36% and 63%, respectively. The NHTSA 2 evaluations showed a reduction in upper neck moment forces of 5%. These results indicate a reduced likelihood of injury during a vehicle impact event when the method of the present invention is employed. Moreover, the method of the present invention helps direct the air bag in a desired direction while providing separation from interior surfaces. For example, in a driver side configuration, the present invention covers the perimeter of the steering wheel when fully deployed even though it deploys at an angle relative to the housing and center of the steering wheel.

While the best mode for carrying out the invention has been described in detail, those familiar with the art to which this invention relates will recognize various alternative designs and embodiments for practicing the invention as defined by the following claims.

What is claimed is:

1. A method of folding an air bag for a motor vehicle, the air bag being initially uninflated and having a front panel and a back panel disposed opposite the front panel, the method comprising:
    positioning the air bag such that a center line divides the front and back panels into symmetrical first and second side portions;
    extending the air bag in a first direction along the center line such that there are no folds in the air bag, wherein a first end of the air bag disposed furthest from an inlet is disposed in a first position and a second end of the air bag is disposed opposite the first end;
    positioning a first perimeter section of the first side portion toward the center line and between the front and back panels to create a first upper pleat and a first lower pleat while the first end is disposed in the first position such that the first upper pleat is not stitched to the first lower pleat and wherein no other pleats are provided with the first side portion;
    positioning a second perimeter section of the second side portion toward the center line and between the front and back panels to create a second upper pleat and a second lower pleat while the first end is disposed in the first position; and
    rolling the air bag in a second direction disposed opposite the first direction to create a rolled portion;
    wherein positioning of the first upper and lower pleats and the second upper and lower pleats relative to the center line is kept constant prior to rolling the air bag and wherein the second end is not folded over the rolled portion.

2. The method of claim 1 wherein the air bag is disposed proximate a housing having a cavity and the step of rolling the air bag further comprises packing the air bag into the cavity.

3. The method of claim 2 wherein the step of extending the air bag further comprising extending the air bag in the first direction until the back panel is pulled taught against the housing.

4. The method of claim 2 wherein the housing further comprising a trim panel and the method further comprises the step of positioning the trim panel proximate the housing to conceal the air bag.

5. The method of claim 1 wherein the step of rolling the air bag further comprises rolling the air bag along a lower side having the first and second lower pleats.

6. The method of claim 1 wherein the step of rolling the air bag further comprises rolling the air bag along an upper side having the first and second upper pleats.

7. The method of claim 1 wherein the step of positioning the air bag further comprises centering the front panel over the back panel.

8. A method of folding an inflatable air bag for a motor vehicle, the air bag being associated with an air bag module having a housing that includes a cavity and an inflator adapted to provide an inflator gas to actuate the air bag from a deflated condition to an inflated condition, the air bag having a front panel and a back panel disposed opposite the front panel, the method comprising:
 positioning the air bag such that at least a portion of the back panel is disposed proximate the housing and at least a portion of the front panel is disposed proximate the back panel;
 centering the air bag about the housing such that a center line divides the front and back panels into first and second side portions;
 extending the air bag in a first direction along the center line such that there are no folds in the air bag and a tether is disposed substantially parallel to and symmetrically disposed about the center line, wherein a first end of the air bag disposed furthest from the housing is disposed in a first position;
 positioning a first perimeter section of the first side portion toward the center line and between the front and back panels to create a first upper pleat and a first lower pleat when the first end is disposed in the first position, wherein no other pleats or folds are provided with the first side portion and the first upper pleat is not stitched to the first lower pleat after positioning the first perimeter section;
 positioning a second perimeter section of the second side portion toward the center line and between the front and back panels to create a second upper pleat and a second lower pleat when the first end is disposed in the first position, wherein no other pleats or folds are provided with the second side portion and the second upper pleat is not stitched to the second lower pleat after positioning the second perimeter section;
 maintaining positions of the first upper and lower pleats and the second upper and lower pleats relative to the center line;
 rolling the air bag in a second direction disposed opposite the first direction while the positions of the first upper and lower pleats and the second upper and lower pleats are maintained, thereby creating a rolled portion; and
 packing the air bag into the cavity such that a second end of the air bag disposed opposite the first end is not folded over the rolled portion.

9. The method of claim 8 wherein the step of rolling the air bag further comprises rolling the air bag along a lower side having the first and second lower pleats.

10. The method of claim 8 wherein the step of rolling the air bag further comprises rolling the air bag along an upper side having the first and second upper pleats.

11. The method of claim 8 wherein the step of rolling the air bag further comprises rolling the air bag toward the housing until a rolled portion of the air bag is disposed in the cavity.

12. The method of claim 8 wherein the housing further comprises a front surface disposed adjacent to the cavity and the step of positioning the air bag further comprises positioning the front and back panels approximately parallel to the front surface.

13. The method of claim 8 wherein the tether further comprises a first tether end and a second tether end disposed opposite the first tether end, wherein the second tether end is attached to the back panel adjacent to the housing.

14. An air bag for a motor vehicle, the air bag being associated with an inflator adapted to provide an inflation gas to the air bag to actuate the air bag from a deflated condition to an inflated condition and a housing adapted to receive the air bag when in the deflated condition, the air bag comprising:
 a front portion and a back portion disposed opposite the front portion, the back portion having an inlet adapted to receive the inflation gas;
 first and second side portions disposed on opposite sides of a center line that symmetrically divides the front and back portions when the air bag is deflated and extended along the center line in a first direction such that there are no folds in the air bag, wherein a first end of the air bag in disposed in a first position;
 a first folded portion formed along the first side portion when the first end is disposed in the first position, the first folded portion including a first upper pleat, a first lower pleat, and a first fold disposed between the first upper and lower pleats and that is moved toward the center line to define the first upper and lower pleats, wherein no other folds are provided between the front and back portions of the first side portion and wherein that the first upper and lower pleats are not stitched to each other;
 a second folded portion formed along the second side portion when the first end is disposed in the first position, the second folded portion including a second upper pleat, a second lower pleat, and a second fold disposed between the second upper and lower pleats and that is moved toward the center line to define the second upper and lower pleats; and
 a rolled portion incorporating the first and second folded portions;
 wherein the rolled portion unrolls away from a head of a vehicle occupant when the air bag is inflated; and
 wherein positioning of the first upper and lower pleats and the second upper and lower pleats relative to the center line is kept constant before incorporation into the rolled portion and wherein a second end disposed opposite the first end is not folded over the rolled portion.

15. The air bag of claim 14 further comprising a tether disposed between the front and back panels and extending parallel to the center line.

16. The air bag of claim 15 wherein the tether is disposed between the first and second folds.

17. The air bag of claim 15 wherein the center line further comprises a first end and a second end disposed opposite the first end, the first direction is oriented toward the first end, and the tether includes a first tether end attached to the front panel and a second tether end attached to the back panel, wherein the first tether end is disposed closer to the first end than the second tether end before the air bag is extended in the first direction.

18. The air bag of claim 14 wherein the housing is disposed proximate a vehicle instrument panel.

19. The air bag of claim 14 wherein the housing is disposed proximate a vehicle steering wheel.

20. The air bag of claim 14 wherein the front and back panels are symmetrical.

* * * * *